United States Patent
Martin et al.

(10) Patent No.: US 11,347,397 B2
(45) Date of Patent: May 31, 2022

(54) TRAFFIC CLASS MANAGEMENT OF NVME (NON-VOLATILE MEMORY EXPRESS) TRAFFIC

(71) Applicant: EMC IP Holding Company LLC, Hopkinton, MA (US)

(72) Inventors: Owen Martin, Hopedale, MA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 38 days.

(21) Appl. No.: 16/589,216

(22) Filed: Oct. 1, 2019

(65) Prior Publication Data

US 2021/0096749 A1 Apr. 1, 2021

(51) Int. Cl.
*G06F 3/06* (2006.01)

(52) U.S. Cl.
CPC ............ *G06F 3/0611* (2013.01); *G06F 3/067* (2013.01); *G06F 3/0662* (2013.01); *G06F 3/0689* (2013.01)

(58) Field of Classification Search
None
See application file for complete search history.

(56) References Cited

U.S. PATENT DOCUMENTS

| | | | |
|---|---|---|---|
| 9,946,465 B1* | 4/2018 | Martin | G05B 13/0265 |
| 2004/0008629 A1* | 1/2004 | Rajagopal | H04L 41/5051 370/239 |
| 2012/0281536 A1* | 11/2012 | Gell | H04W 28/18 370/235 |
| 2016/0179403 A1* | 6/2016 | Kurotsuchi | G06F 3/0635 711/114 |
| 2020/0081652 A1* | 3/2020 | Nukala | G06F 9/544 |

* cited by examiner

*Primary Examiner* — Charles Rones
*Assistant Examiner* — Jonah C Krieger
(74) *Attorney, Agent, or Firm* — Krishnendu Gupta; Nikhil Patel

(57) ABSTRACT

Embodiments of the present disclosure relate to traffic class management of NVMe (non-volatile memory express) traffic. One or more input/output (I/O) operations are received at a device interface coupled to one or more storage devices of a storage array. A service level (SL) corresponding to each of the one or more I/O operations is determined. Each of the one or more I/O operations is transmitted to the one or storage devices over a virtual channel of a set of virtual channels based on the determined SL corresponding to each of the one or more I/O operations.

18 Claims, 5 Drawing Sheets

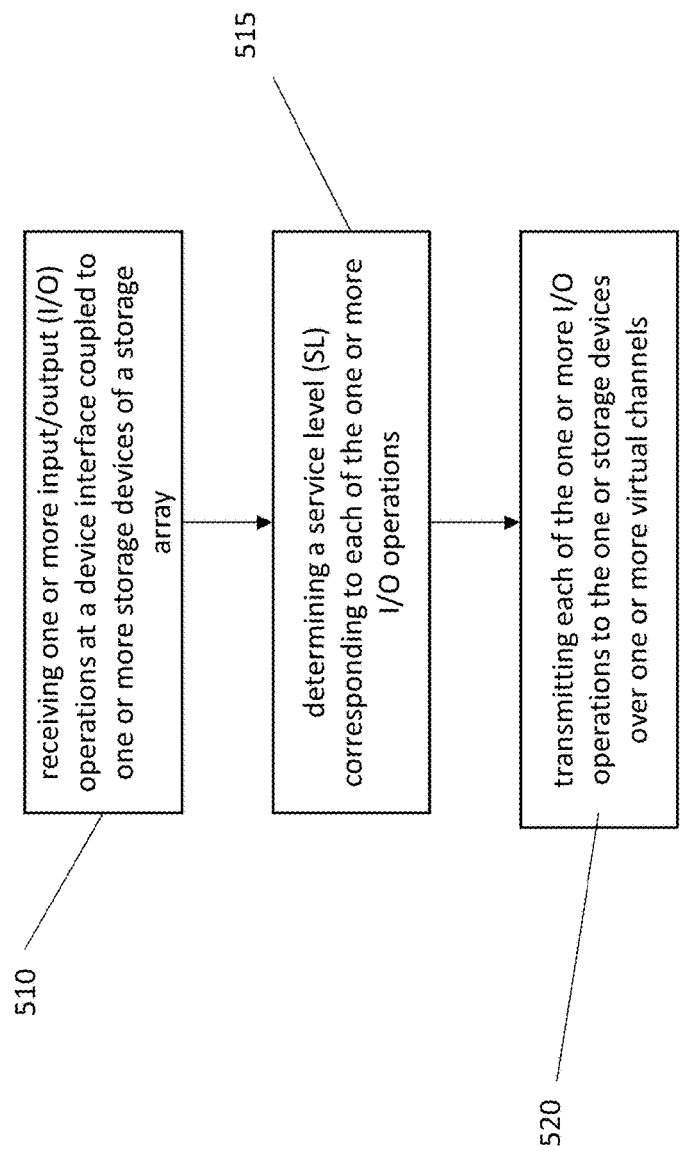

TRAFFIC CLASS MANAGEMENT OF NVME (NON-VOLATILE MEMORY EXPRESS) TRAFFIC

BACKGROUND

The management of storage infrastructure components begins with defining products and services followed by defining service levels for these products and services. The service level defines the scope of the service, the associated security definitions, level of criticality to the business, and severity or priority levels. It also defines the response time associated with each level, hours of normal operation, promises of quality, and speed of service. These service levels are defined with metrics that can be monitored and measured.

Establishing management processes and implementing appropriate tools is the key to meeting service levels proactively. The management process establishes procedures for efficient handling of incidents, problems, and change requests to the storage infrastructure environment. The tools help in monitoring and executing management activities on the infrastructure. It is important to manage not just the individual components, but the storage infrastructure end-to-end due to the components' interdependency.

SUMMARY

One or more aspects of the present disclosure relate to traffic class management of NVMe (non-volatile memory express) traffic. One or more input/output (I/O) operations are received at a device interface coupled to one or more storage devices of a storage array. A service level (SL) corresponding to each of the one or more I/O operations is determined. Each of the one or more I/O operations is transmitted to the one or more storage devices over a virtual channel of a set of virtual channels based on the determined SL corresponding to each of the one or more I/O operations.

In embodiments, each of the one or more I/O operations can be encapsulated with a traffic class header based on one or more of: a host device associated with each subject I/O operation and an application associated with each subject I/O operation. Each of the one or more I/O operations can be encapsulated with the traffic class header at a host adapter of the storage array.

In embodiments, the SL corresponding to each of the one or more I/O operations can be determined by performing a look-up within a data structure configured to associate traffic classes with SLs.

In embodiments, the device interface can be coupled to the one or more storage devices via a physical link. A number of virtual channels associated with the physical link can be provided based on a number of SLs, wherein each virtual channel corresponds to a distinct SL. Each I/O operation to one of the virtual channels can be assigned based on a SL match of each I/O operation and each virtual channel.

In embodiments, transmission of I/O operations over each virtual channel can be prioritized based on the SL assigned to each virtual channel with respect to all other virtual channels associated with the physical link.

In embodiments, the prioritization for each virtual channel can include a weight based on historical I/O traffic patterns. The weight can indicate a number of I/O operations to transmit during a given time interval from each virtual channel.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIG. 5 is a flow diagram of an example method for managing NVMe traffic in accordance with example embodiments disclosed herein.

DETAILED DESCRIPTION

A storage array can achieve the benefits of economies of scale by consolidating many disparate workloads into a single system. For example, multiple hosts, each running different applications can interact with the storage array to, e.g., write or read data from storage media of the storage array. Each application can have different business value to an organization. To handle large workloads, the storage array can provide input/output (I/O) operations (e.g., data requests such as read or write requests) associated with each application with service level (SL) designations to prioritize traffic at its front-end (e.g., a host adapter). The front-end is commonly the array's interface with one or more hosts or a storage area network (SAN). Based on the SL designations, the front-end of the array queues I/O operations' access to the array's back-end elements manage access to the array's storage media.

Once an I/O operation is released from a queue, the front-end passes the I/O operation to one or more disk adapters (DAs) (i.e., a back-end element) configured to manage data flow to the storage media. Currently, DAs may only be configured to treat I/O operations equally (e.g., without consideration of SL designations). Accordingly, the storage array may not process critical workloads at its back-end prior to non-critical workloads.

Embodiments of the present disclosure extend SL prioritization to a back-end of the storage arrays. For example, the embodiments can implement one or more protocols (e.g., an NVMe protocol) configured to access high-speed storage media to map front-end SL assignments of I/O operations to back-end virtual channels and traffic classes supported by such protocols. The SL back-end mapping advantageously enables customer defined traffic prioritization to maintain end-to-end priority. Thus, the disclosed embodiments can provide increased throughput for critical workloads as discussed in greater detail herein.

Figure 1:
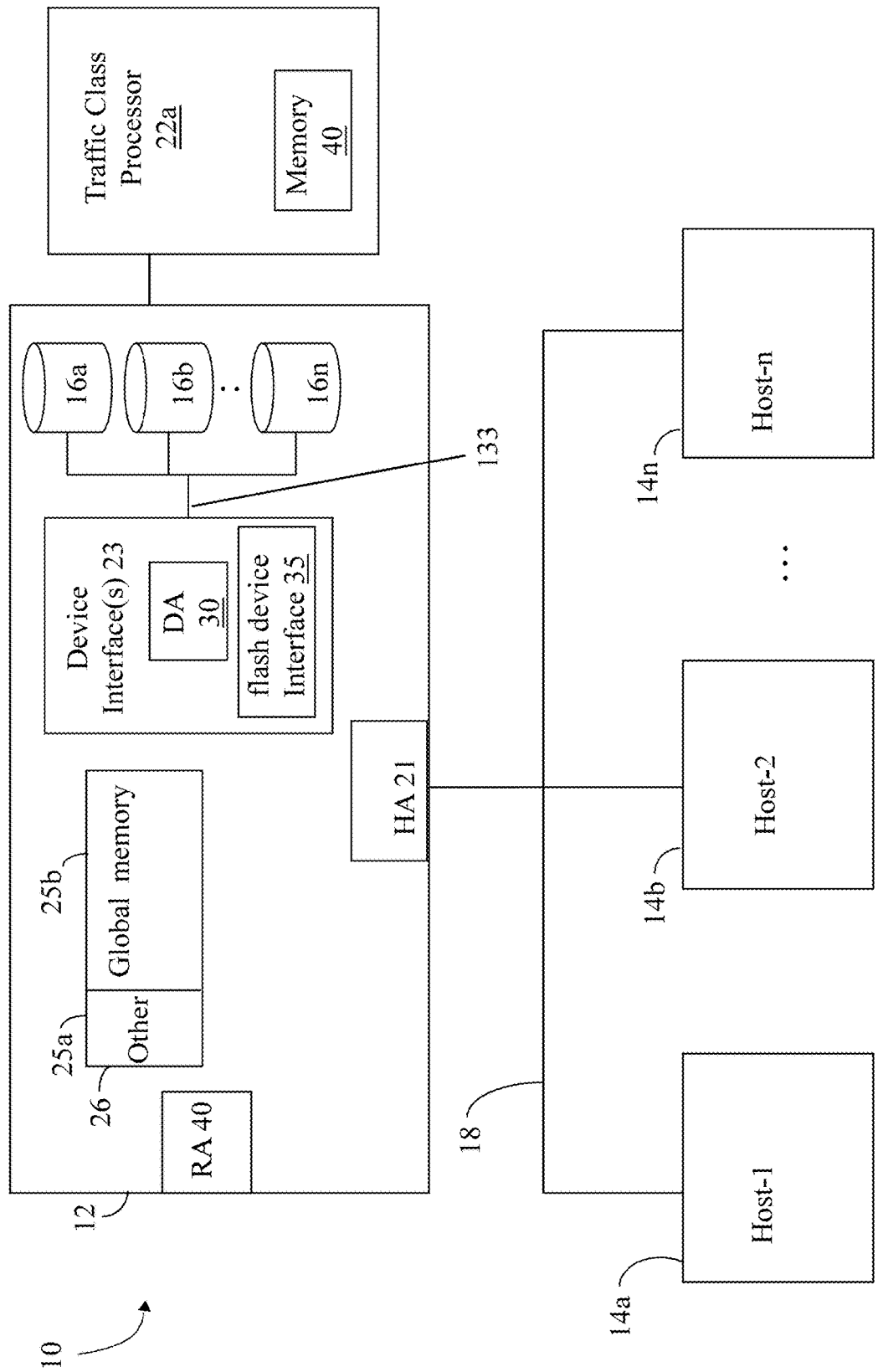
FIG. 1 is a block diagram of an example a storage system in accordance with example embodiments disclosed herein.

Regarding FIG. 1, a system 10 includes a data storage system 12 connected to host systems 14a-14n through communication medium 18. In embodiments, the hosts 14a-14n can access the data storage system 12, for example, to perform input/output (I/O) operations or data requests.

The communication medium 18 can be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host 14a-14n can access and communicate with the data storage system 12. The hosts 14a-14n can also communicate with other components included in the system 10 via the communication medium 18.

Each of the hosts 14a-14n and the data storage system 12 can be connected to the communication medium 18 by any one of a variety of connections as may be provided and supported in accordance with the type of communication medium 18. The processors included in the hosts 14a-14n may be any one of a variety of proprietary or commercially available single or multi-processor system, such as an Intel-based processor, or other type of commercially available processor able to support traffic in accordance with each embodiment and application.

It should be noted that the examples of the hardware and software that may be included in the data storage system 12 are described herein in more detail and can vary with each embodiment. Each of the hosts 14a-14n and data storage system 12 can all be located at the same physical site or can be located in different physical locations. Examples of the communication medium 18 that can be used to provide the different types of connections between the host computer systems and the data storage system of the system 10 can use a variety of different communication protocols such as SCSI, NVMe, Fibre Channel, iSCSI, and the like. Some or all the connections by which the hosts 14a-14n and data storage system 12 can be connected to the communication medium may pass through other communication devices, such switching equipment that may exist such as a phone line, a repeater, a multiplexer or even a satellite.

Each of the hosts 14a-14n can perform different types of data operations in accordance with different types of tasks. In embodiments, any one of the hosts 14a-14n may issue a data request to the data storage system 12 to perform a data operation. For example, an application executing on one of the hosts 14a-14n can perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by DELL Technologies of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more storage media drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. The techniques described herein can be used in an embodiment in which one or more of the devices 16a-16n are flash drives or devices. More generally, the techniques herein may also be used with any type of SSD although following paragraphs can refer to a particular type such as a flash device or flash memory device.

The data storage array 12 may also include different types of adapters or directors, such as an HA 21 (host adapter), RA 40 (remote adapter), and/or device interface 23. Each of the adapters HA 21, RA 40 may be implemented using hardware including a processor with local memory with code stored thereon for execution in connection with performing different operations. The HA 21 may be used to manage communications and data operations between one or more host systems 14a-14n and the global memory (GM) 25b. In an embodiment, the HA 21 may be a Fibre Channel Adapter (FA) or another adapter which facilitates host communication. The HA 21 may be characterized as a front-end component of the data storage system 12 which receives a request from one or more of the hosts 14a-14n. The data storage array 12 can include one or more RAs (e.g., RA 40) that may be used, for example, to facilitate communications between data storage arrays. The data storage array 12 may also include one or more device interfaces 23 for facilitating data transfers to/from the data storage devices 16a-16n. The data storage interfaces 23 may include device interface modules, for example, one or more disk adapters (DAs) 30 (e.g., storage media controllers), flash drive interface 35, and the like. The DA 30 can be characterized as a back-end component of the data storage system 12 which interfaces with the physical data storage devices 16a-n via, e.g., a physical link 133.

One or more internal logical communication paths may exist between the device interfaces 23, the RAs 40, the HAs 21, and the memory 26. An embodiment, for example, may use one or more internal busses and/or communication modules. For example, the global memory 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The data storage system as described in this embodiment, or a device thereof, such as a storage medium or aspects of a flash device, should not be construed as a limitation. Other types of commercially available data storage systems, as well as processors and hardware controlling access to these devices, may also be included in an embodiment.

Host systems 14a-14n provide data and access control information through channels of the communication medium 18 to the storage systems 12, and the storage systems 12 may also provide data to the host systems 14a-14n also through the channels. The host systems 14a-14n do not address the drives or devices 16a-16n of the storage systems directly, but rather access to data can be provided to one or more host systems 14a-n from what the host systems view as a plurality of logical devices or logical volumes (LVs) via, e.g., the HA 21. The LVs may or may not correspond to the actual physical devices or drives 16a-16n. For example, one or more LVs may reside on a single physical drive or multiple drives. Data in a single data storage system, such as a single data storage array 12, may be accessed by multiple hosts allowing the hosts to share the data residing therein. The HA 21 may be used in connection with communications between a data storage array 12 and one or more of the host systems 14a-n. The RA 40 may be used in facilitating communications between two data storage arrays. The DA 30 may be one type of device interface used in connection with facilitating data transfers to/from the associated storage drive(s) 16a-n and LV(s) residing thereon. A flash device interface 35 may be another type of device interface used in connection with facilitating data transfers to/from the associated flash devices and LV(s) residing thereon. It should be noted that an embodiment may use the same or a different device interface for one or more different types of devices than as described herein.

The device interface, such as a DA 30, performs I/O operations on a drive 16a-16n. In the following description, data residing on an LV may be accessed by the device interface following a data request in connection with I/O operations that other directors originate. Data may be accessed by LV in which a single device interface manages data requests in connection with the different one or more LVs that may reside on a drive 16a-16n. For example, a device interface may be a DA 30 that accomplishes the foregoing by creating job records for the different LVs associated with a device. These different job records may be associated with the different LVs in a data structure stored and managed by each device interface.

The hosts 14a-n can issue data requests using one or more applications that each have different business value to an organization. Each host 14a-n can also have different business values to an organization. Accordingly, the HA 21 can organize the LVs into storage groups and designate a service level (SL) to each group. Based on customer defined traffic priorities associated with each application and/or the host issuing the data request, the HA 21 can queue data operations in one of the storage groups having a corresponding SL designation.

Each SL assignment can define a quality of service (QoS) (e.g., expected performance envelope) expected by a host. In other words, the system 12 is configured to prioritize a dedication of resources (e.g., hardware and/or software) for handling data requests associated with high SLs compared to data requests associated with low SLs. In embodiments, the performance envelope can be defined as a range of input/output operations per second (IOPS). The ranges of performance envelopes can be broken into SL assignment groups such as Diamond, Optimized, Platinum, Gold, Silver, and Bronze, with Bronze having the lowest range of IOPS and Diamond having the highest range of IOPS. To control the IOPS for each SL assignment group, the HA 21 can queue data operations in each storage group for a predetermined delay based on each group's SL designation. Based on the SL associated with each storage group, the HA 21 releases data requests from queues to the DA 30 once the predetermined delay lapses.

In embodiments, the HA 21 can encapsulate each data request (e.g., I/O operation) with a traffic class header in response to queuing each data request into a storage group. The traffic class header can correspond to the SL designation of the storage group in which the data request is queued. In other embodiments, the HA 21 can encapsulate each data request with the traffic class header in response to releasing the data request from a storage group. The traffic class header can be encapsulated based on a high-speed storage media access protocol implemented by the back-end of the storage array 12.

For example, the HA 21 can obtain a data structure that maps traffic class headers to SL designations from a traffic class processor 22a. The traffic class processor 22a can store the data structure in memory 40. The data structure can be any known or yet to be known searchable data structure that associates one set of data to another set of data. In other embodiments, the traffic class processor 22a can monitor data requests from hosts 14a-n and dynamically provide the HA 21 with the data structure. In other embodiments, the HA 21 obtains the data structure upon initialization of the storage array 12 and receives updates to the data structure from the traffic class processor 22a in response to any changes in customer defined traffic prioritization.

In embodiments, the DA 30 can comprise the traffic class processor 22a. In some embodiments, the traffic class processor 22a can exist external to the DA 30 but internal to the storage system 12 (e.g., at the back-end). In other embodiments, the traffic class processor 22a can be an external device and communicatively coupled to the DA 30 via any one of a variety of communication connections.

In response to the HA 21 releasing data requests from queues to the DA 30, and the traffic class processor 22a determines a SL corresponding to each data request based on the traffic class header encapsulated on each data request. The traffic class processor 22a transmits each data request to one or more storage drives 16a-n over a virtual channel of a set of virtual channels (e.g., one of virtual channels 310a-n of FIG. 3) based on the determined SL corresponding to each of the one or more I/O operations and as described in greater detail herein.

Figure 2:
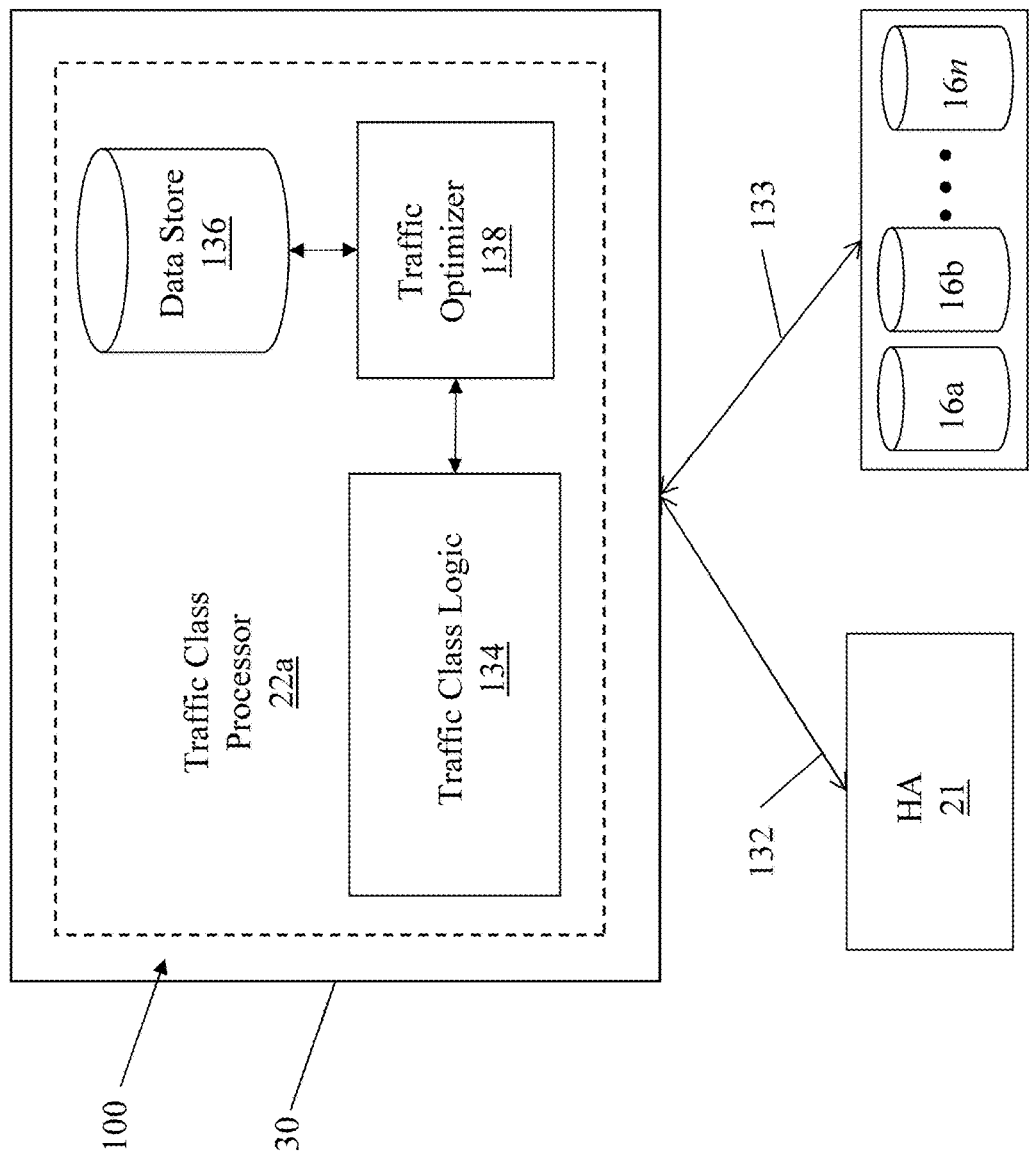
FIG. 2 is a block diagram of an example traffic class processor in accordance with example embodiments disclosed herein.

Regarding FIG. 2, a disk adapter (DA) 30 of a storage array (e.g., storage system 12) can include elements 100 (e.g., software and hardware elements) such as traffic class processor 22a. It should be noted that the traffic class processor 22a may be any one of a variety of commercially available processors, such as an Intel-based processor, and the like. Although what is described herein shows details of components including software that may reside in the traffic class processor 22a, all or portions of the illustrated components may also reside elsewhere such as, for example, on interfaces 23, HA 21, or any of the host systems 14a-14n of FIG. 1. In other embodiments, the traffic class processor 22a can be a parallel processor such as a graphical processing unit (GPU).

Included in the traffic class processor 22a is traffic class logic 134 which monitors one or more processing threads (e.g., I/O operations and data requests such as read/write operations) of the data storage system through the connection 132 with HA 21. The traffic class logic 134 is configured to determine a traffic class and corresponding SL of each data request. For example, the traffic class logic 134 can analyze traffic class headers encapsulated on each data request to make the determination. It should be noted that the traffic class logic 134 can further be configured to make the determination using any of the techniques described herein.

Using the determination, a traffic optimizer 138 controls transmissions of the data request over physical link 133 to storage media 16a-n. For example, the traffic optimizer 138 can queue each data request in a virtual channel of a set of virtual channels (e.g., one of virtual channels 310a-n of FIG. 3) based on the determined traffic class and SL corresponding to each data request. In embodiments, the traffic optimizer 138 performs a look-up in a data structure stored in data store 136 that associates traffic classes and corresponding SLs to virtual channels to identify a correct virtual channel for transmission of the data request. Accordingly, the traffic class optimizer can control IOPS for each data request based on a predetermined delay corresponding to each virtual channel that matches the delay introduced to each data request at the front-end of the storage device. For example, each virtual channel can be mapped, by a data structure stored in the data store 136, to one or more SL assignment groups and thus be associated with a predetermined delay matching the delay introduced at the front-end of the storage system. The traffic optimizer 138, using traffic arbitration logic (e.g., logic 305 of FIG. 3), releases data requests from each virtual channel to the storage media 16a-n over link 133 in response to each virtual channel's delay lapsing as described in greater detail herein.

Figure 3:
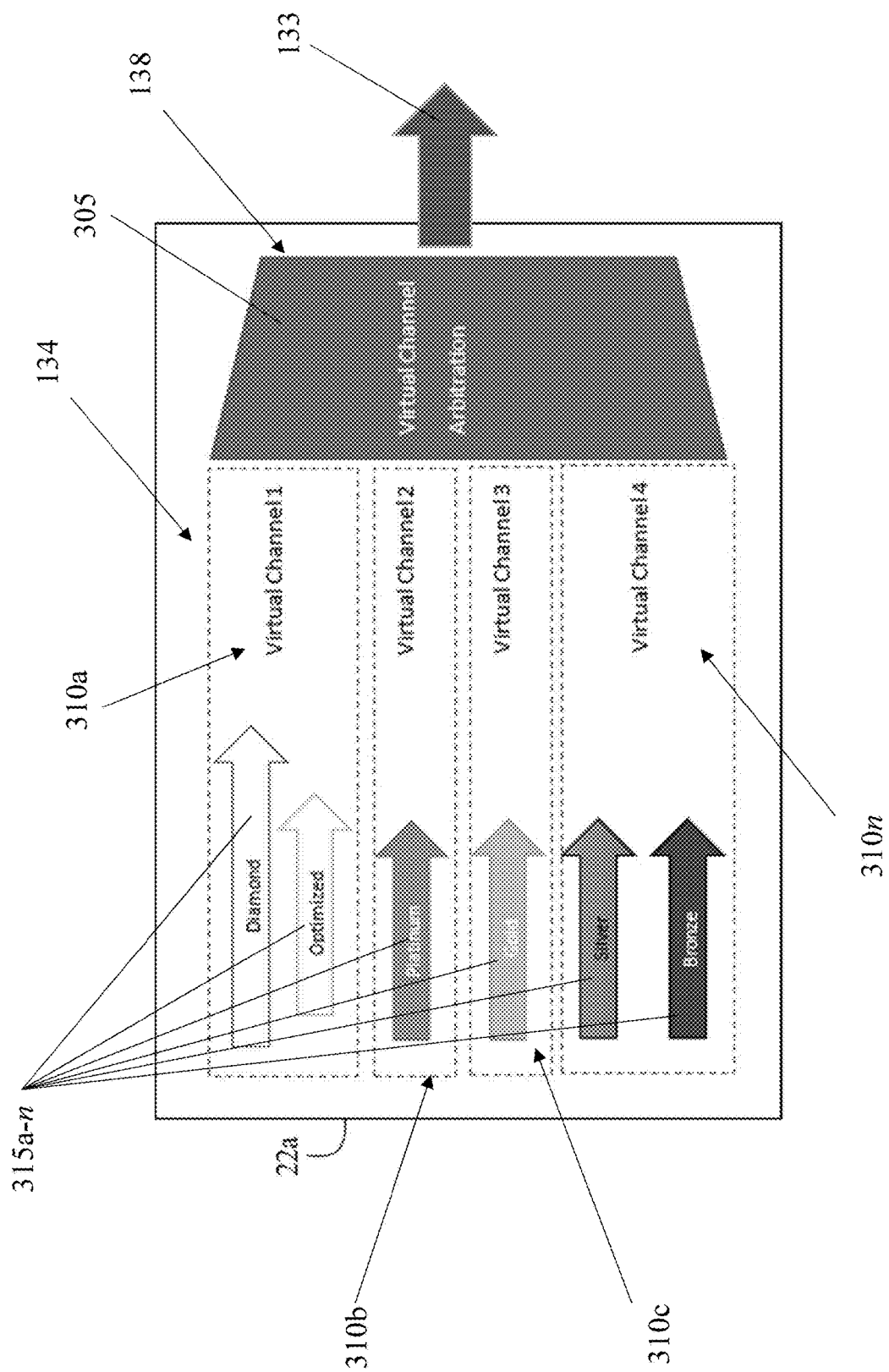
FIG. 3 is a block diagram of virtual channels used for management of NVMe (Non-Volatile Memory Express) traffic in accordance with example embodiments disclosed herein.

Regarding FIG. 3, a traffic class processor 22a can include traffic class logic 134 and traffic optimizer 138. In embodiments, the traffic class logic 134 can establish virtual channels 310a-n to control transmissions of data requests to storage media (e.g., storage media 16a-n of FIG. 1) via a physical link 133. Thus, the virtual channels 310a-n are associated with and can be logical representations of the physical link 133.

For example, applications used by an organization can each have different business values. As such, data requests (e.g., I/O operations) corresponding to each application can have a traffic priority corresponding to each application's business value. During initialization of a storage array (e.g., array 12 of FIG. 1), the organization can define quality of service (QoS) (e.g., expected performance envelope) levels for each application. The QoS levels can be grouped based on their respective performance envelopes (e.g., range of input/output operations per second (IOPS)). Each group can be assigned a service level (SL) having designations 315a-n as described above with respect to FIG. 1.

Based on a number of different SL designations 315a-n, the traffic class logic 134 can establish corresponding virtual channels (e.g., channels 310a-n). The traffic class logic 134 can establish any ratio of SL designations 315a-n to number of virtual channels (e.g., 1:1, 1:2, etc.). In embodiments, the traffic class logic 134 can determine a number of virtual channels to establish as a function of one or more of: number of SL designations and each SL designation's expected performance envelope. In some embodiments, the number of virtual channels can be limited by the communication protocol used by the storage array.

Further, the traffic class logic 134 can assign each established virtual channel with a traffic class that defines parameters for arbitrating data requests from each virtual channel for transmission to storage media. The parameters can include average transfer size of the traffic. Further, the traffic class logic 134 can associate each SL designation 315a-n with a respective traffic class. Accordingly, traffic workloads (e.g., data requests) transmission based on SL designations 315a-n can further be prioritized based on one or more of the static and dynamic parameters at a back-end of a storage array (e.g., at DA 30 of array 12 of FIG. 1). In the example illustrated by FIG. 3, there are six (6) SL designations 315a-n that are each mapped to one of four (4) virtual channels 310a-n.

In response to receiving data requests, the traffic class logic 134 analyzes traffic class headers encapsulated on each data request and assigns each data request to one or more of the virtual channels 310a-n as discussed in greater with respect to FIGS. 1-2. Accordingly, the traffic class logic 134 can be configured as a switch that enhances a routing of priority traffic (e.g., data requests) to the storage media.

In embodiments, the traffic optimizer 138 controls transmissions of the data request over the physical link 133 to the storage media. For example, the traffic optimizer 138 can queue each data requests assigned to each of the virtual channels 310a-n using virtual channel arbitration logic 305. The virtual channel arbitration logic 305 adjust transmission times (e.g., prioritize) of traffic associated with each of the virtual channels 310a-n based on a weight associated with, e.g., historical I/O traffic patterns. In embodiments, the weight can indicate a number of I/O operations to transmit during a given time interval from each of the virtual channels 310a-n. Accordingly, the virtual channel arbitration logic 305 can use the weight to buffer (e.g., queue) transmissions from each of the virtual channels 310a-n in a time-slicing fashion. As such, the virtual channel arbitration logic 305 can dynamically update the weight based on apparent workloads (e.g., traffic patterns). For example, the virtual channel arbitration logic 305 can arbitrate traffic transmissions using a phased weighted round robin technique. The weighted round robin technique can include determining whether traffic such as priority traffic (i.e., data requests having a predetermined threshold SL designation such as having greater than a Gold SL designation) is sequential or random and selecting a phase arbitration that enables more sequential transfer over sparse transfer for random loads.

Figure 4:
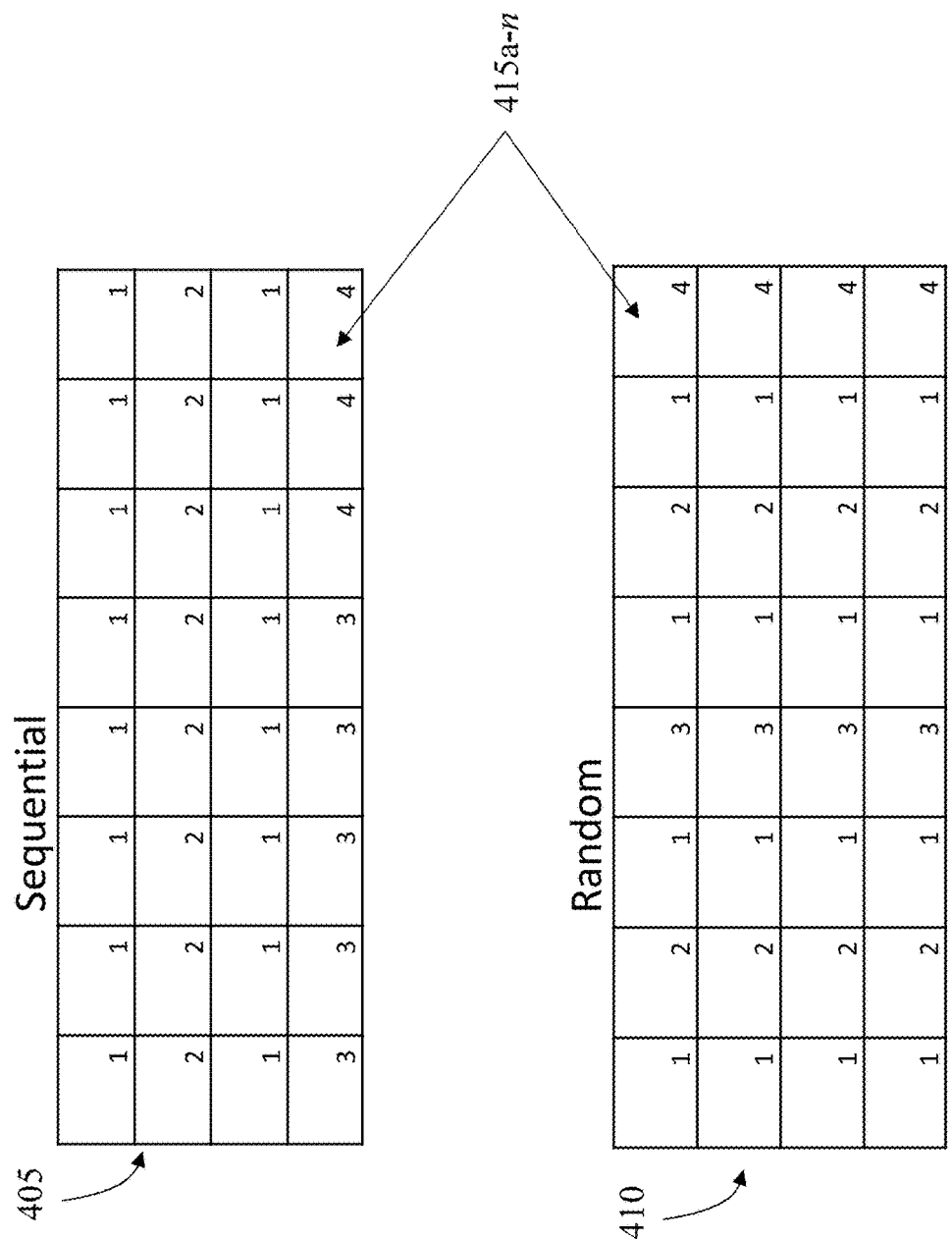
FIG. 4 shows tables of traffic flow patterns used to manage of NVMe traffic in accordance with example embodiments disclosed herein.

Regarding FIG. 4, tables 405-410 illustrate example traffic profiles, each having thirty-two (32) phases 415a-n. Each of the 32 phases 415a-n represents an I/O operation (e.g., data request) having a SL designation. In this example illustrated by FIG. 4, each SL designation (e.g., Diamond, Platinum, etc.) is represented by a numeral, and a skilled artisan understands that any known or yet to be known technique can be used to represent each SL designation. Table 405 illustrates a sequential traffic pattern, while table 410 illustrates a random traffic pattern.

Referring back to FIG. 3, the virtual channel arbitration logic 305 can analyze traffic patterns (e.g., those illustrated by tables 405-410) to apply a phased weighted round robin technique arbitrate traffic transmissions to storage media via the physical link 133.

Regarding FIG. 5, a method 500 can be executed by a device, e.g., the DA 30 and/or traffic class processor 22a of FIG. 2. The method 500, at 510, can include receiving one or more input/output (I/O) operations at a device interface (e.g., the DA) coupled to one or more storage devices of a storage array (e.g., array 12 of FIG. 1). The device interface can include, e.g., the DA and traffic class processor. In embodiments, the method 500, at 510, can also include encapsulating each of the one or more I/O operations with a traffic class header based on one or more of: a host device associated with each subject I/O operation and an application associated with each subject I/O operation. Each of the one or more I/O operations can be encapsulated with the traffic class header at a host adapter, e.g., HA 21 of FIG. 2, of the storage array. The method 500, at 515, can include determining a service level (SL) corresponding to each of the one or more I/O operations. In embodiments, the method 500, at 515, can also include determining the SL corresponding to each of the one or more I/O operations by performing a look-up within a data structure configured to associate traffic classes with SLs. The method 500, at 520, can include transmitting each of the one or more I/O operations to the one or more storage devices over a virtual channel of a set of virtual channels (e.g., virtual channels 310a-n of FIG. 3) based on the determined SL corresponding to each of the one or more I/O operations. In embodiments, the transmission can occur via a physical link (e.g., link 133 of FIGS. 2-3) that connects the device interface and the one or more storage devices. The method 500, at 520, can also include providing a number of virtual channels associated with the physical link based on a number of SLs. Each virtual channel can correspond to a distinct SL. Further, the method 500, at 520, can include assigning each I/O operation to one of the virtual channels based on a SL match of each I/O operation and each virtual channel. The transmission of I/O operations over each virtual channel can be prioritized based on the SL assigned to each virtual channel with respect to all other virtual channels associated with the physical link. Additionally, prioritization for each virtual channel can include a weight based on historical I/O traffic patterns. The weight can indicate a number of I/O operations to transmit during a given time interval from each virtual channel.

Methods and/or flow diagrams are illustrated with this disclosure for simplicity of explanation. The methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the concepts described herein by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random-access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical storage media, or optical storage media).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic storage media, internal hard storage media, removable storage media, magneto-optical storage media, CD-ROM, and/or DVD-ROM storage media. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the concepts described herein may be embodied in other specific forms without departing from the spirit or essential characteristics thereof. The foregoing embodiments are therefore to be considered in all respects illustrative rather than limiting of the concepts described herein. Scope of the concepts is thus indicated by the appended claims, rather than by the foregoing description, and all changes that come within the meaning and range of equivalency of the claims are therefore intended to be embraced therein.

What is claimed is:

1. A method comprising:
    receiving one or more input/output (I/O) operations at a device interface coupled to one or more storage devices of a storage array;
    encapsulating each I/O operation with a traffic class header based on a high-speed storage media access protocol implemented by the storage array;
    determining a service level (SL) corresponding to each of the one or more I/O operations, wherein determining the SL includes analyzing traffic headers encapsulated on each data request related to the I/O operations; and
    transmitting each of the one or more I/O operations to the one or more storage devices over a virtual channel of a set of virtual channels based on the determined SL corresponding to each of the one or more I/O operations, wherein transmitting the one or more I/O operations includes controlling I/O per second (IOPS) of data requests related to the one or more I/O operations based on a delay corresponding to each virtual channel.

2. The method of claim 1 further comprising encapsulating each of the one or more I/O operations with a traffic class header based on one or more of: a host device associated with each subject I/O operation and an application associated with each subject I/O operation.

3. The method of claim 2, wherein each of the one or more I/O operations is encapsulated with the traffic class header at a host adapter of the storage array.

4. The method of claim 2, wherein determining the SL corresponding to each of the one or more I/O operations includes performing a look-up within a data structure configured to associate traffic classes with SLs.

5. The method of claim 1, wherein the device interface is coupled to the one or more storage devices via a physical link.

6. The method of claim 5 further comprising providing a number of virtual channels associated with the physical link based on a number of SLs, wherein each virtual channel corresponds to a distinct SL.

7. The method of claim 6 further comprising assigning each I/O operation to one of the virtual channels based on a SL match of each I/O operation and each virtual channel.

8. The method of claim 7, wherein transmission of I/O operations over each virtual channel is prioritized based on the SL assigned to each virtual channel with respect to all other virtual channels associated with the physical link.

9. The method of claim 8, wherein the prioritization for each virtual channel includes a weight based on historical I/O traffic patterns, wherein the weight indicates a number of I/O operations to transmit during a given time interval from each virtual channel.

10. An apparatus comprising at least one processor configured to:
    receive one or more input/output (I/O) operations at a device interface coupled to one or more storage devices of a storage array;
    encapsulate each I/O operation with a traffic class header based on a high-speed storage media access protocol implemented by the storage array;
    determine a service level (SL) corresponding to each of the one or more I/O operations, wherein determining the SL includes analyzing traffic headers encapsulated on each data request related to the I/O operations; and
    transmit each of the one or more I/O operations to the one or more storage devices over a virtual channel of a set of virtual channels based on the determined SL corresponding to each of the one or more I/O operations, wherein transmitting the one or more I/O operations includes controlling I/O per second (IOPS) of data requests related to the one or more I/O operations based on a delay corresponding to each virtual channel.

11. The apparatus of claim 10 further configured to encapsulate each of the one or more I/O operations with a traffic class header based on one or more of: a host device associated with each subject I/O operation and an application associated with each subject I/O operation.

12. The apparatus of claim 11, wherein each of the one or more I/O operations is encapsulated with the traffic class header at a host adapter of the storage array.

13. The apparatus of claim 11, wherein determining the SL corresponding to each of the one or more I/O operations includes performing a look-up within a data structure configured to associate traffic classes with SLs.

14. The apparatus of claim 10, wherein the device interface is coupled to the one or more storage devices via a physical link.

15. The apparatus of claim 14 further configured to provide a number of virtual channels associated with the physical link based on a number of SLs, wherein each virtual channel corresponds to a distinct SL.

16. The apparatus of claim 15 further configured to assign each I/O operation to one of the virtual channels based on a SL match of each I/O operation and each virtual channel.

17. The apparatus of claim 16, wherein transmission of I/O operations over each virtual channel is prioritized based on the SL assigned to each virtual channel with respect to all other virtual channels associated with the physical link.

18. The apparatus of claim 17, wherein the prioritization for each virtual channel includes a weight based on historical I/O traffic patterns, wherein the weight indicates a number of I/O operations to transmit during a given time interval from each virtual channel.

\* \* \* \* \*